United States Patent [19]

Mosse

[11] Patent Number: 5,727,369
[45] Date of Patent: Mar. 17, 1998

[54] METHODS FOR CONVEYING OBJECTS THROUGH APPARATUS, PACKING APPARATUS AND METHODS FOR PACKING MATERIALS IN CARTONS

[75] Inventor: Richard W. E. Mosse, London, United Kingdom

[73] Assignee: Tetra Laval Holdings and Finance SA., Pully, Switzerland

[21] Appl. No.: 583,125

[22] PCT Filed: Jul. 13, 1994

[86] PCT No.: PCT/GB94/01511

§ 371 Date: Apr. 25, 1996

§ 102(e) Date: Apr. 25, 1996

[87] PCT Pub. No.: WO95/02539

PCT Pub. Date: Jan. 26, 1995

[30] Foreign Application Priority Data

Jul. 15, 1993 [GB] United Kingdom .................. 9314647

[51] Int. Cl.⁶ .................. B65B 43/50; B65B 43/60; B65G 47/52; B65G 47/92
[52] U.S. Cl. .................. 53/467; 53/473; 53/279; 198/472.1; 198/803.1; 198/803.6
[58] Field of Search .................. 198/472.1, 803.6, 198/465.2, 465.1, 803.1; 53/467, 471, 279, 343, 575, 579, 473, 574, 272

[56] References Cited

U.S. PATENT DOCUMENTS

| | | | |
|---|---|---|---|
| 1,350,405 | 8/1920 | Gaynor | 53/343 X |
| 2,239,120 | 4/1941 | Stewart et al. | 53/279 |
| 2,540,120 | 2/1951 | Jacobs et al. | 53/279 X |
| 2,687,202 | 8/1954 | Nordquist et al. | 198/472.1 |
| 2,721,020 | 10/1955 | Meyer | 53/343 X |
| 2,863,550 | 12/1958 | Hommel | 198/472.1 |
| 2,929,801 | 1/1960 | Pechy | 198/472.1 X |
| 2,940,584 | 6/1960 | Kunz | 198/472.1 |
| 3,581,872 | 6/1971 | Grossjohann | 198/472.1 |
| 3,941,237 | 3/1976 | MacGregor, Jr. | 198/803.01 |
| 5,058,731 | 10/1991 | Corniani et al. | 198/803.01 |
| 5,158,168 | 10/1992 | Bedin | 198/803.01 X |
| 5,224,585 | 7/1993 | Blanco et al. | 198/803.01 |
| 5,232,079 | 8/1993 | Belcastro et al. | 198/370.11 |
| 5,509,524 | 4/1996 | Ohmori et al. | 198/465.1 |

*Primary Examiner*—Horace M. Culver
*Attorney, Agent, or Firm*—Cushman Darby & Cushman IP Group of Pillsbury Madison & Sutro LLP

[57] ABSTRACT

Objects such as cartons (16) supported in transport holders (110), are carried on a first conveyor wheel (140) and transferred to a second conveyor wheel in respective transfer operation. Each conveyor wheel has circumferential spaced recesses for carrying such objects, each recess containing a moveable magnet (156) for holding a said object. The wheels run tangentially to one another so that each object on the first conveyor wheel during each transfer operation is momentarily simultaneously in recesses of the first conveyor wheel and of the second conveyor wheel. Transfer is triggered by the timed withdrawal of the magnet holding the object in the recess of the first conveyor wheel by a cam (170) leaving the object held by the magnet of the second conveyor wheel. Cartons may be bottom sealed, filed and top sealed on respective conveyor wheels.

22 Claims, 5 Drawing Sheets

METHODS FOR CONVEYING OBJECTS THROUGH APPARATUS, PACKING APPARATUS AND METHODS FOR PACKING MATERIALS IN CARTONS

This application claims benefit of International application PCT/GB94/01511, filed Jul. 13, 1994.

The present invention relates to methods of transporting objects through apparatus, such as packing machinery for packing materials into cartons, and to methods for the operation of said machinery.

Containers into which liquid or solid contents may be packed include rigid containers such as cans and bottles and non-rigid containers such as cartons. The rigid containers suffer from the disadvantages that they are made from materials which are costly and expensive to transport and store. Compared to cartons however these containers have the advantage that they are more robust and that because of this they can be subjected to greater forces during their handling in packing machines.

It is therefore possible to operate packing machines filling materials into such rigid containers at speeds which are substantially higher than those which are currently achievable for cartons. A typical canning or bottling line may run at 300 to 1000 containers per minute whilst the best carton packing machinery will have difficulty in reaching 200 cartons per minute. Attempts to run such carton packing machines at higher speeds encounter the problem that the cartons are deformed or damaged due to the higher acceleration forces to which they are subjected and hence machine operation becomes unreliable and impracticable.

If one attempts to overcome this problem by making the carton walls thicker and hence more rigid, the cost of the packing materials risks unacceptably and the cartons are unnecessarily robust for their purpose once they leave the packing line.

GB-A-410557 discloses apparatus for packing flour into paper bags in which the bags are supported in respective transport holders, carried round on a first wheel whilst being filled, transferred to a second wheel, and then closed whilst being carried round on the second wheel.

The two wheels are arranged tangential to one another but to transfer from one wheel to the next, the transport holders have to be pushed radially in the instant of transfer. As the transport holders occupy positions on the wheels which are inboard from the periphery of the wheel, this is unavoidable. Containers of liquid could not be treated this way at commercially required speeds without spillage.

Even in the context of filling robust containers, it would be desirable to develop means of carrying them through packing machinery in a smooth and rapid manner.

The present invention now provides a method of conveying objects comprising carrying said objects on a first conveyor and transferring said objects to a second conveyor in respective transfer operations, wherein said first conveyor and said second conveyor each have a location or a plurality of spaced locations for carrying such objects each said location having means for holding a said object in said location, and wherein each said object when held in a said location on said first conveyor follows a path which runs tangential to and in the same direction as a portion of a path followed by said second conveyor, and during each said transfer operation the respective object is momentarily simultaneously in a carrying location of said first conveyor and in a carrying location of said second conveyor to which the said object is transferred.

In contrast to the scheme shown in GB-A-410557, there is no radial displacement with respect to either conveyor path at the instant of transfer.

Preferably each of the first and second conveyors will have a plurality of carrying locations, preferably from 5 to 20 such locations per conveyor, eg. about eight.

Preferably, the or each said carrying location on both the first and the second conveyor comprise recesses for receiving respective ones of said objects such that in each said transfer operation a said object is simultaneously received in and bridges between recesses on said first and second conveyors.

To accommodate the complex rotary relative motion involved between the two conveyors where they run together and the transferred object, the recesses and said objects may be so shaped that when a said object is simultaneously received in a pair of recesses of the first and second conveyors, the object is rotatable within each said recess about a respective axis transverse to the plane in which the object is being conveyed. The respective axes may or may not be coincident.

Suitably, each said recess has a surface engaging the object received therein which in cross-section transverse to said axis of rotatability defines a part circle. Thus the recess may be a concave part cylindrical, e.g. hemi-cylindrical channel, optionally having one or more cavities in the wall thereof.

Said object may be cylindrical or may have a pair of oppositely disposed ends which are each substantially part cylindrical, e.g. hemi-cylindrical. Preferably, each said holding means comprises one or more magnets. The objects should then be magnetically attractable.

Said objects may be caused to transfer from the holding means of the first conveyor to the holding means of the second conveyor by the action of biassing means acting on said objects such as one or more biassing magnets. Said biassing magnet or magnets can be fixed although less preferably, they can travel with one of the conveyors.

Preferably, said holding means magnets and said biassing means magnet or magnets are permanent magnets but optionally at least one said magnet is an electromagnet and said object is caused to transfer from the first to the second conveyor by total or partial activation or deactivation of said electromagnet.

Preferably, in each transfer operation said object is caused to transfer from the first to the second conveyor by a decrease in the magnetic force holding said object on the first conveyor and/or an increase in the magnetic force attracting the object to the second conveyor when said object is momentarily simultaneously in a carrying location of said first conveyor and in a carrying location of said second conveyor.

Preferably, said decrease in magnetic force is produced by moving the or a magnet holding said object on said first conveyor away from said object.

Preferably, said movement of said magnet is produced by a cam acting on a cam follower connected to said magnet.

Preferably, said cam is a stationary cam having a closed curved cam track, e.g. an annular cam.

Preferably, the magnetic attraction of said magnet or magnets attracting said object to said first conveyor is substantially equal to the magnetic attraction of said magnet or magnets for holding said object in said second conveyor, when said object is simultaneously in said carrying locations of said first and second conveyors, prior to said movement of the or a magnet holding said object on said first conveyor.

Each conveyor is preferably a rotary wheel conveyor.

Said objects may each comprise a transport holder containing a carton held in the transport holder such that the transport holder holds the carton by its corner creases and thus supports the side walls of the carton.

The invention includes a method of packing material in cartons comprising transporting cartons on a first conveyor in transport holders adapted to support the side walls of the cartons, subjecting the supported cartons to filling, transferring the cartons in their transport holders to a second conveyor by a method as claimed in any preceding claim, and top sealing the cartons carried on the second conveyor to form closed filled cartons and removing said cartons from said transport holders.

Each carton can be transported in its own respective holder into which it may be introduced as a tubular sleeve prior to bottom sealing.

Said transport holders are preferably carried on an endless conveyor whilst being loaded with said carton blanks and said transport holders are transferred from said endless conveyor to a further endless conveyor by a transfer method of the invention prior to said filling operation.

The carton blanks may be sterilised whilst in said holders and said transport holders containing said cartons are preferably carried on an endless conveyor during said sterilization process and are transferred onto said endless conveyor for sterilization from a previous endless conveyor by a transfer method of the invention and are also transferred from said endless conveyor on which they are sterilized to a further endless conveyor by a similar method.

The invention further includes apparatus for conveying objects comprising a first conveyor for carrying said objects, a second conveyor for carrying said objects once transferred thereto in respective transfer operations from said first conveyor, said first conveyor and said second conveyor each having a location or a plurality of spaced locations for carrying such objects and each said location having means for holding a said object in said location, the conveyors being arranged such that each said object when held in a said location on said first conveyor follows a path which runs tangential to and in the same direction as a portion of a path followed by said second conveyor and during each said transfer operation the respective object is momentarily simultaneously in a carrying location of said first conveyor and in a carrying location of said second conveyor to which the said object is transferred, and means for causing each object in turn to transfer from the first conveyor to the second conveyor holding means on passing through said transfer operation.

Said carrying locations on both the first and the second conveyor preferably comprise recesses for receiving respective ones of said objects such that in each said transfer operation a said object is simultaneously received in and bridges between recesses on said first and second conveyors.

The invention includes apparatus as described above in combination with a plurality of said objects, wherein said recesses and said objects are so shaped that when a said object is simultaneously received in the recesses of the first and second conveyors, the object is rotatable within each said recess about a respective axis transverse to the plane in which the object is being conveyed. Accordingly, each said recess may have a surface engaging the object received therein which in cross-section transverse to said axis of rotatability defines a part circle.

Each said holding means preferably comprises one or more magnets.

The apparatus preferably comprises biassing means acting on said objects to cause said objects to transfer from the holding means of the first conveyor to the holding means of the second conveyor in said transfer operation, e.g. one or more biassing magnets acting on said objects which are preferably fixed and like said holding means magnets are preferably permanent magnets although at least one electromagnet may be used to cause transfer from the first to the second conveyor by activation or deactivation of said electromagnet. Movement of a magnet away from its carrying location to decrease the magnetic attraction acting on the object may be employed to trigger transfer as described above.

Preferably therefore, said means for reducing the magnetic attraction holding said object on the first conveyor when said object is momentarily simultaneously in a carrying location of said first conveyor and in a carrying location of said second conveyor comprises means acting on the or a magnet holding an object on said first conveyor to move said magnet away from the carrying location of said first conveyor.

Preferably, said means for moving said magnet comprises a cam having a shaped cam surface, for the or each carrying location of said first conveyor, for the or each carrying location of said first conveyor, a cam follower mounted to move over said cam surface in synchrony with movement of said first conveyor, means connecting the or each said cam follower to a said magnet in the carrying location no transmit movement of said cam follower to produce corresponding movement of said magnet, and means mounting the said magnet for movement away from the back toward an operative position in said carrying location in response to movement of the or the respective cam follower.

The invention also includes, apparatus for packing materials in cartons comprising a series of conveyors for carrying said cartons in transport holders suitable to support the side walls of the cartons, means associated with at least one of said conveyors for carrying out a respective treatment on said cartons whilst being carried on said conveyor, said treatments including for example at least filling and top sealing, said conveyors each having a location or a plurality of spaced locations for carrying such transport holders and each said location having means for holding a said transport holder in said location, the conveyors being arranged such that each said transport holder when held in a said location on said first conveyor follows a path which runs tangential to and in the same direction as a portion of a path followed by a subsequent conveyor in said series and during each said transfer operation the respective transport holder is momentarily simultaneously in a carrying location of said upstream conveyor and in a carrying location of said subsequent conveyor to which the said transport holder is transferred, and means for causing each transport holder in turn to transfer from each upstream conveyor to the next subsequent conveyor holding means on passing through said transfer operation.

The treatments carried out during carriage on respective conveyors may include introducing said cartons into said transport holders as open ended tubular blanks, sterilizing said tubular blanks, and forming bottom closures of said tubular blanks filing said blanks, top sealing the resulting filled cartons and discharging the cartons from the transport holders.

Preferably, each said conveyor is a rotary wheel conveyor.

In the handling of cartons in liquid packing machines the usual practice is to conduct certain operations or even each operation on the cartons whilst they are stationary. Thus the cartons are usually loaded from a magazine where they are held as flattened tubular blanks which are erected to an open tubular form and loaded onto mandrels to be brought in turn into a bottom sealing station in which they are held stationary whilst a bottom closure is formed. They are then carried to a filling station in which they are filled, usually again whilst stationary. Finally, a top closure is formed. Normally, again the cartons will be brought to a halt for this.

In canning or bottling plants, the necessary operations are generally carried out on the containers whilst they are in motion. For this purpose they will be transported at various stages on endless conveyor means, particularly rotary conveyor means, so that the equipment acting on the containers for functions such as filling or closing can move around a continuous path with the containers. Generally, this necessitates the transfer of the containers from one endless conveyor to another where the next operation is carried out. Such transfers have always posed particular problems for cartons which are not sufficiently robust to withstand the accelerations involved when such machines are operated at speed.

By virtue of the use of transport holders supporting the side walls of the cartons according to the teaching of the present invention however it becomes possible to treat the transport holders containing the cartons much as bottles and cans have been treated in the past. Generally speaking, cartons in such transport holders may be operated upon whilst in motion for the purposes of forming top or bottom closures or for filling.

Each transport holder may constitute a sleeve for receiving a carton blank so as to surround it on four sides, the carton being introduced as a blank from the top or bottom of the holder. Alternatively, the holder may constitute a channel surrounding the blank on three sides so that the blank may be introduced and the filled and closed carton may be withdrawn through the remaining open side.

The invention will be further described and illustrated by the following description of a specific embodiment illustrated in the accompanying drawings in which.

Figure 1:
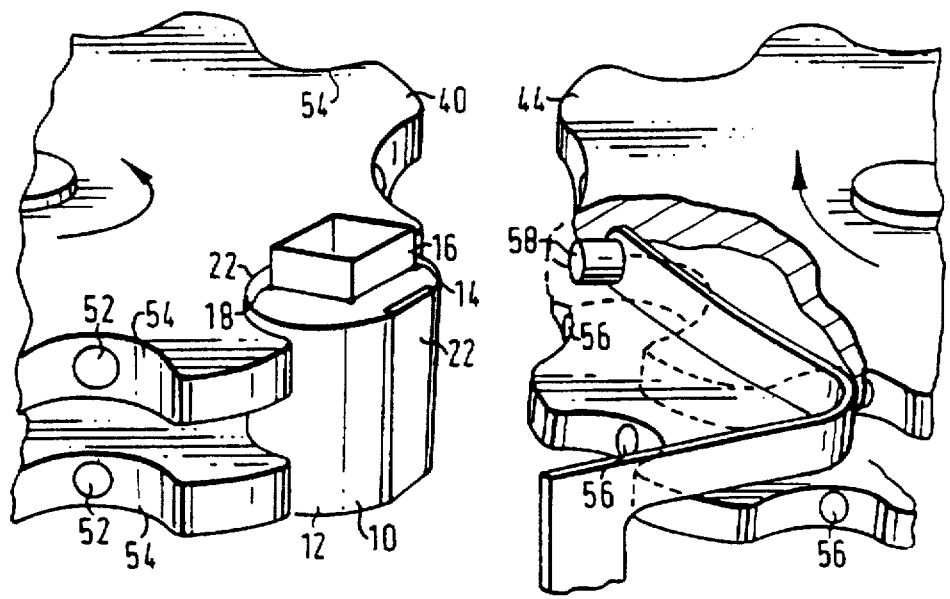
FIG. 1 is a perspective view of a transport holder for use in accordance with the invention containing an open ended tubular carton blank and showing a portion of each of two wheel conveyors interacting with the transport holder.

As shown in FIG. 1, a transport holder 10 for use in accordance with the invention may comprise a shell 12 which may suitably be of plastics or of metal, e.g. of aluminum alloy. The illustrated shell 12 has a generally circular transverse cross-section and defines a rectangular cross section channel 14 in which one sees in FIG. 1 a conventional open-ended tubular laminated paper board carton blank 16. Cartons of plastics sheet or plastics laminate sheet may also be employed e.g. injection moulded cartons. This protrudes from the top and bottom of the transport holder 10. Part circular cross-section channels 18 may be provided at each corner of the rectangular channel 14 in the transport holder shell 12 to avoid damage to the corners of the blank.

Figure 2:
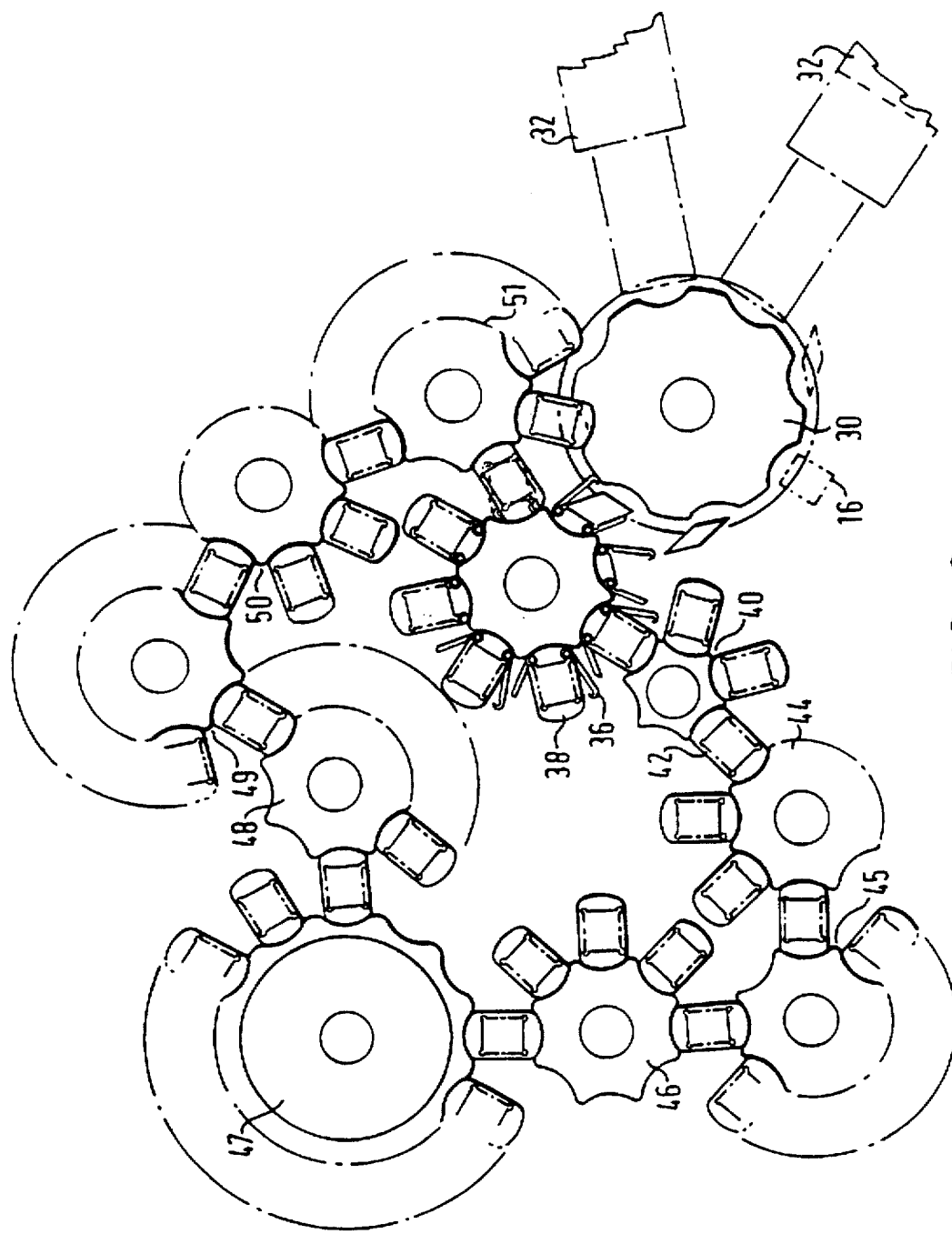
FIG. 2 shows in schematic plan view apparatus according to the invention in which transport holders similar to the type shown in FIG. 1 are loaded with carton blanks and transferred between conveyors as the carton blanks are filled and sealed.
Figure 3:
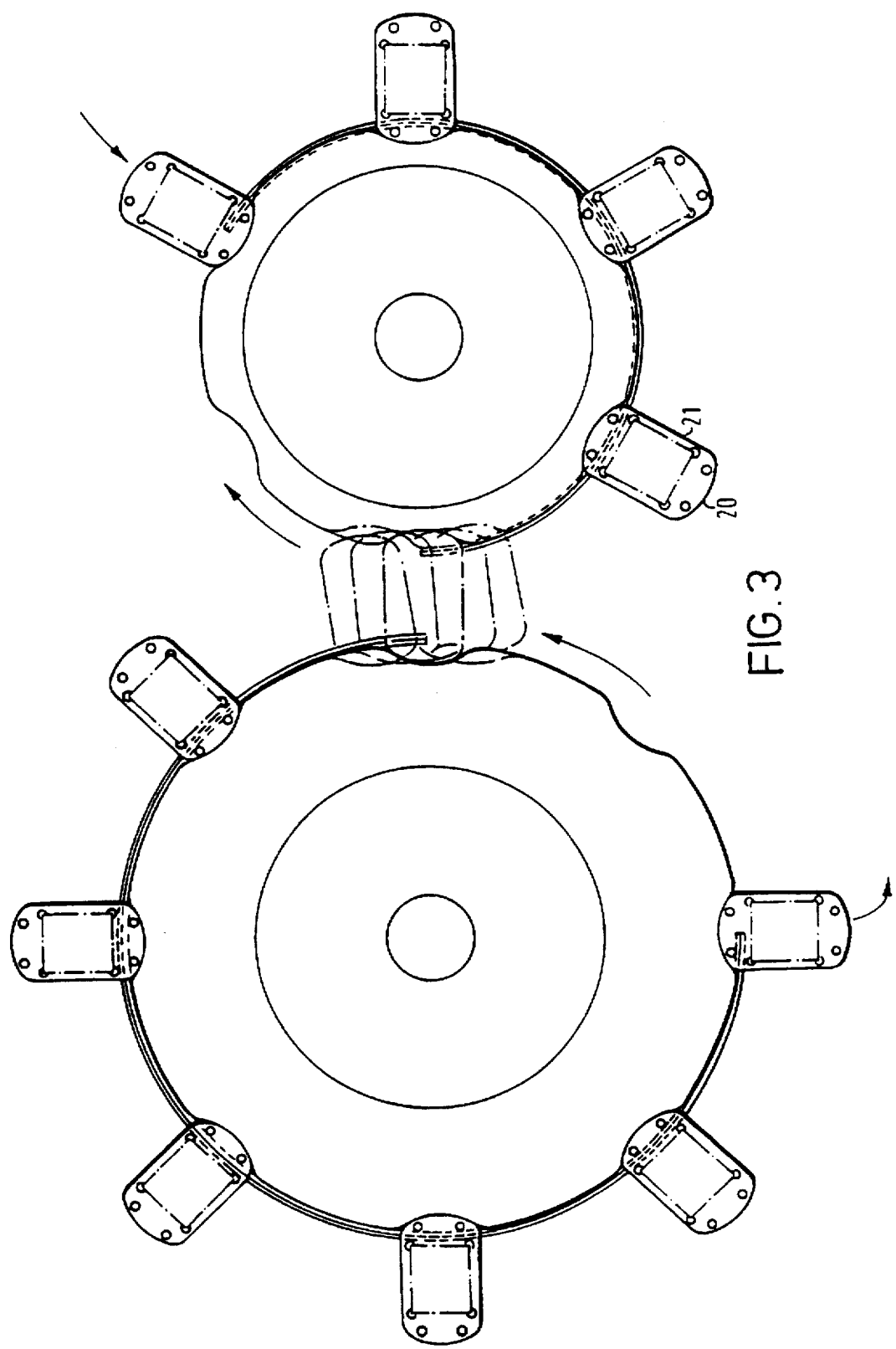
FIG. 3 shows the interaction between two conveyors carrying transfer holders in apparatus according to the invention as illustrated in FIG. 2 and illustrates the transfer of a transport holder from one to the other of the conveyors.

The shells 12 shown in FIGS. 2 and 3 are modified in that they have curved ends 20 which are part circular in cross-section separated by parallel sides 21. At each end 20 or at diametrically opposed locations there is provided a bar 22 contained within the body of the material of the shell 12. The bar 22 may be a permanent magnet or may be passively magnetically attractable, e.g. may be of soft iron. If it is not intended to be a permanent magnet, then it should preferably be made of an attractable material which will not acquire a permanent magnetic field of any substance when placed in contact with a permanent magnet.

The bar 22 need not be in the form of a bar but can be in the form of one or more pieces of any desired shape. It need not be contained within the body of the shell 12 but can be mounted on its surface.

As shown in FIG. 2, apparatus for the transport and treatment of packing containers according to the invention may comprise a carton sleeve feeder constituted by a wheel or turret conveyor 30 adapted to receive carton blanks either from a magazine of precut blanks or as the product of cutting and folding laminated paper board unwound from one or more unwinding stations 32 (two shown) in a known manner. The paper board blanks 16 are carried by the conveyor 30 to a carton loading wheel 36 having an upper and a lower set of receiving stations. The carton blanks 16 in tubular open ended form are loaded into upper receiving stations 38 whilst transport holders 10 of the kind shown in FIGS. 1 and 2 are loaded into lower receiving stations (not shown) immediately below the receiving stations 38. By means not shown, the carton blanks are pushed down into the channels 14 of the respective transport holders 10 and the transport holders containing carton blanks are unloaded and transferred to a third wheel conveyor 40 at a transfer location 42. Whilst on the conveyor 40, the blanks are subjected to sterilisation. They are then transferred in a similar manner to a fourth conveyor 44. Whilst being transported on this conveyor the bottom panels of each blank in sequence are folded to form a base closure. After transfer to a further conveyor wheel 45, the bases are sealed. The transport holders and the blanks they contain are then transferred to a conveyor wheel 46 where the height of the carton tops is adjusted and on to a further conveyor wheel 47. Whilst they are transported on that, liquid or solid contents are filled into the open topped cartons. The transport holders and their filled cartons are then transferred to a conveyor wheel 48. Whilst in transit on conveyor wheel 48, the top panels of the blanks are folded down and after transfer to a further conveyor wheel 49 sealed to form a top closure. The filled cartons are removed from the conveyor wheel 49 to a further conveyor wheel 50 on which the sealing fin is folded flat. The containers are transferred to an unloading wheel where they are removed from the transport holders which are fed back to the carton loading wheel 36.

Prior to being filled with contents, the carton blanks may be held in the rectangular channel 14 in their respective transport holder simply by being a close fit. Once the base closures have been formed and the cartons are to be filled, it may be necessary to do something further to prevent the cartons being pulled down by gravity out of the transport holders. This can however be accomplished by providing a floor beneath the carton bases on the conveyor wheel 46 on which they are transported during filling and on the conveyor wheel 48 to 51 to which they then pass.

By virtue of the use of the transport holders which provide support for the side walls of the cartons, the cartons may be moved through the apparatus at a speed which is substantially greater than that achievable on current carton packing lines, e.g. at 200 to 400 cartons per minutes or more. Furthermore, because of the non-stop cursive motion of the cartons through the apparatus, these higher speeds will not result in excessive splashing of liquid contents. Auxiliary apparatus used to perform operations on the carton blanks to form them into filled cartons such as devices for folding and sealing the bottom and top closures and devices for filling contents into the open topped cartons can be provided to rotate with their respective conveyors and can be powered in a known manner by electrical contact through slip rings. These auxiliary pieces of equipment in conventional carton packing machinery in which they operate at a fixed location have generally had to endure a reciprocating motion in which they are moved away to allow cartons to move into their work station and are then brought in to operate on the carton. The need to endure motion of this type restricts the nature of the devices which can be employed and itself imposes limitations on the speed of operation possible. Movement of the auxiliary equipment with the cartons upon which work is being performed will allow a greater range of choice of the nature of the auxiliary equipment used by decreasing the requirement for robustness and will generally provide a higher proportion of the cycle of operation of each piece of auxiliary equipment during which it is actively working on a carton blank, thus again increasing the achievable speeds.

The principle of the preferred method of transfer of the transport holders between successive conveyors is illustrated in FIG. 1 in which a transport holder 10 is seen being passed between by way of example conveyors 40 and 44. Each of conveyors 40 and 44 comprises an upper wheel portion and a lower wheel portion spaced from, parallel to and concentric with the upper wheel portion. The two wheel portions are fast on a common axle. Each conveyor has a plurality of recesses 54 about each wheel portion periphery, the circumferential spacing between recesses 54 being equal on each conveyor. Conveyor 40 is provided with a single permanent magnet 52 in each recess of each wheel portion which interacts with the metal bar 22 at one side of the transport holder 10 to hold the transport holder on the conveyor. The curved side 20 of each transport holder 10 is a conforming fit with a respective curved recess 54 in the conveyor. Conveyor 44 has in each of its recesses 54 a permanent magnet 56 of approximately the same strength as magnet 52. A fixed magnet 58 is provided on a support bracket between the upper and lower wheel portions of conveyor 44 adjacent the path swept by magnet 56 in the nip between the conveyors 44 and 40. As each transport holder 10 is brought in to the nip between the conveyors 40 and 44, the metal bar 22 at the free side of the transport holder 10 is brought close to the magnets 56, 58 as a touching contact is established between the free curved end 22 of the transport holder 10 and the recess 54 of the conveyor 44. As the magnetic attraction provided by the magnets 56, 58 is greater than that provided by the magnet 52, as the transport holder 10 leaves the nip between the two conveyors, it stays with conveyor 54 and detaches from conveyor 40. This can be achieved in a completely smooth manner.

The actual positioning of the magnet or magnets in the recesses 54 is not critical and is a matter of choice. Equally the number of magnets employed may be freely varied. One may use the same number of magnets in each of the two conveyors, choosing magnets of equal strength or may use magnets of different strength in different numbers to obtain equal aggregate strength. Equally, one may use electro-magnets instead of permanent magnets and rely upon the switching on and switching off of the electro-magnets rather than or in addition to differences in their strengths of attraction to achieve the transfer. Equally, one can place the electro-magnets in the transport holder using passive magnetically attractable materials in place of the magnets 52, 56 and 58 in the recesses 54. The illustrated arrangement however has the advantage of simplicity. Alternatively by simply increasing the strength of magnetic attraction continuously along the chain of conveyors instead of using fixed magnets 58, the transport holders can be made to move from one conveyor to the next as desired.

Instead of relying upon differences in magnetic strength or the switching of electro-magnets to effect the transfer between transport holders magnetically held in place in the recesses 54, separate means for biassing the transport holders to cause them to transfer in the interaction between the conveyors may be employed such as fixed ploughs interacting with pins 60 protruding from the transport holders.

Other means of holding the transport holders on the conveyors may be employed. These may for instance include suction heads and may include open ended sprung metal clips serving to hold the transport holders in the recesses 54 in place of the illustrated magnets operating in combination with fixed ploughs of the kind referred to above to bias the transfer of the transport holders from one conveyor to the next.

However, as sterilisation of such machinery is likely to be of importance, the use of magnets as illustrated in FIG. 2 has particular advantages. The working faces of the conveyor wheel portions can be made smooth. The magnets can be covered by a material such as a layer of stainless steel or of plastics which will not detract too much from their attractive power leaving a surface which is easily sterilisable.

Apparatus according to the invention may be provided with a plurality of transport holders having a channel 14 of a first set of dimensions and a further plurality of transport holders having a channel 12 of a different set of dimensions for taking a carton of a different capacity or shape. Any number of different sets of transport holders may be provided in this way so allowing a single carton packing line to be able with minimum adjustment to handle cartons of different sizes or shapes. This may be used to provide the user with flexibility of operation or to provide the manufacturer with the ability to make a decision as to the carton size and shape which any particular machine is going to be adapted to deal with only at a late stage in the manufacture of that machine or to modify a machine held in stock to meet a customer's requirement.

Figure 4:
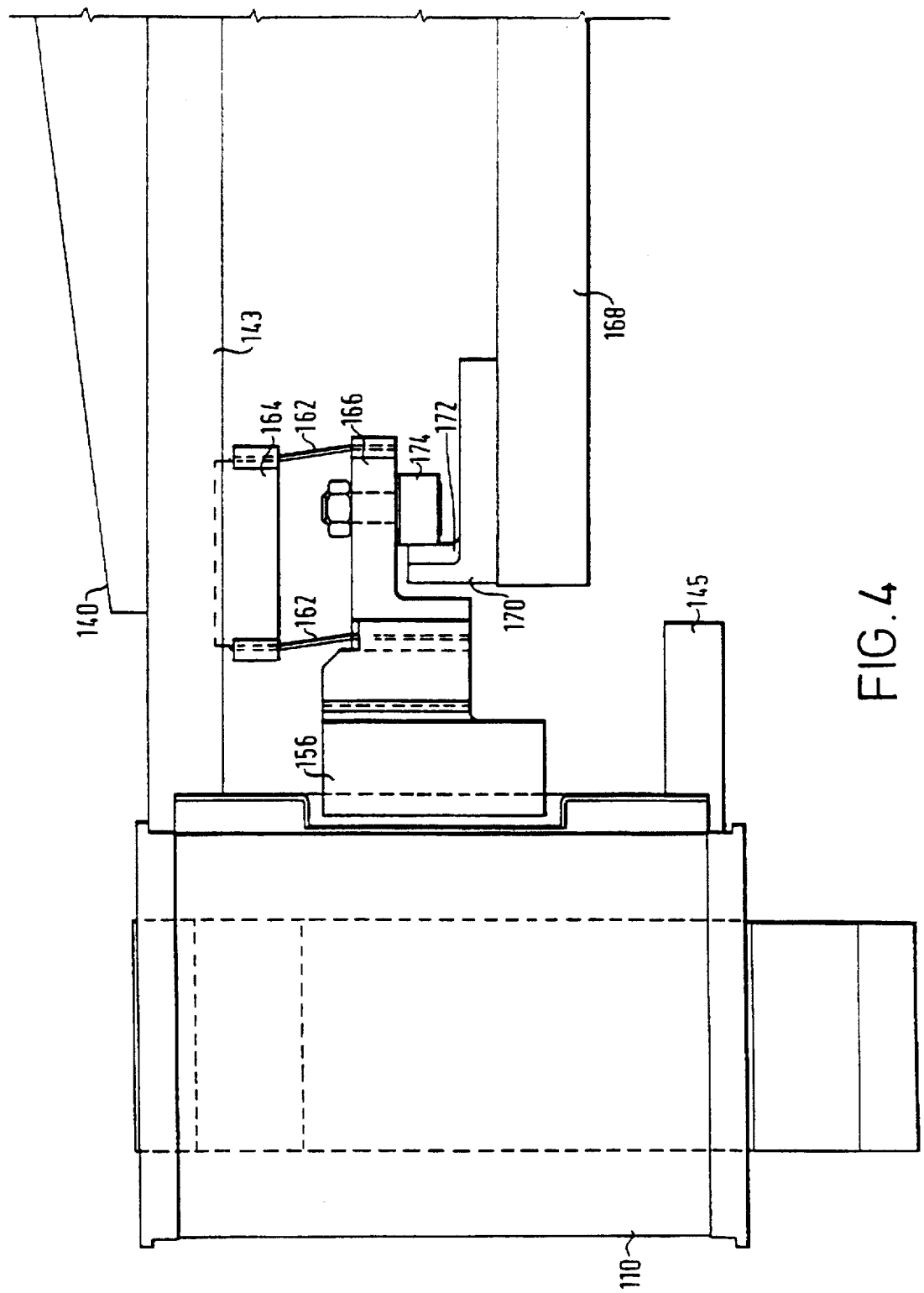
FIG. 4 is a side elevation of part of apparatus according to a second embodiment of the invention showing a moveable magnet for holding a transport holder in a carrying location of a conveyor.

The second embodiment illustrated in FIGS. 4 and 5 resembles that shown in FIGS. 1 to 3 except as described below. In this embodiment, a moveable magnet is used to trigger the transfer from a first conveyor to a second conveyor. An edge part of a conveyor 140 is shown carrying a transport holder 110. At each of a series of circumferentially spaced recessed locations formed in an upper wheel position 143 and a lower wheel position 145 the conveyor 140 has a moveable magnet 156 mounted to the underside of the upper wheel portion 143 via a pair of parallel leaf springs 162. Springs 162 extend from an upper mounting block 164 to a lower mounting block 166. Magnet 156 is attached to the front (radially outwardly directed) face of the lower mounting block 166, which is free to execute a radially inward motion parallel to the underside of the upper wheel portion 143 against biassing by said springs.

A circular plate 168 is fixed parallel to and below the upper wheel portion 143 and has mounted on its upper surface an upstanding flange 170, the radially inwardly facing surface of which is shaped as a cam 172. A cam follower wheel 174 is mounted rotatably on the under side of the lower mounting block 166 such that it runs along the cam 172 to control the radial position of magnet 156.

Cam 170 is shaped such as to withdraw the magnet 156 radially away from the transport holder 110 at the instant when transfer to the next downstream conveyor is desired. The strength of the magnetic attraction used on each conveyor to hold the transport holders in the carrying locations can then be identical so that there is no tendency for a transport holder to jump prematurely to the next conveyor in response to the attraction of a biassing magnet, which could cause splashing of liquid contents or misalignment of the transport holder in the next carrying location. Instead, the transport holder can be brought into the nip between two successive conveyors, where it is fully engaged on the magnet of each, and then the magnet of the upstream conveyor is withdrawn so that on leaving the nip between the conveyors, the transport holder reliably follows the downstream conveyor.

Figure 5:
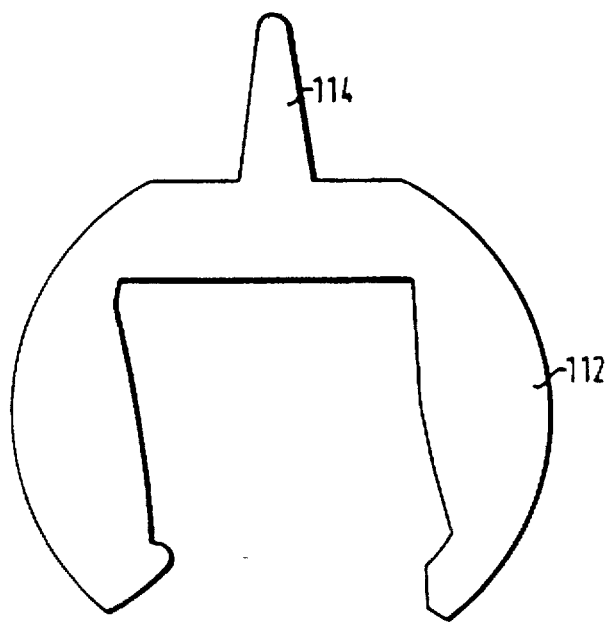
FIG. 5 is a plan view of the region of the second embodiment shown in FIG. 4.

As shown in FIG. 5, each transport holder has a top plate 112, which carries a protruding nose 114. If during a transfer between conveyors, the transport holder becomes rotationally misaligned around the axis of the carton blank, the nose 114 will collide with the wall of the recess 154 in the upper wheel portion 143 and nudge the transport holder round into the correct rotational alignment.

Figure 6:
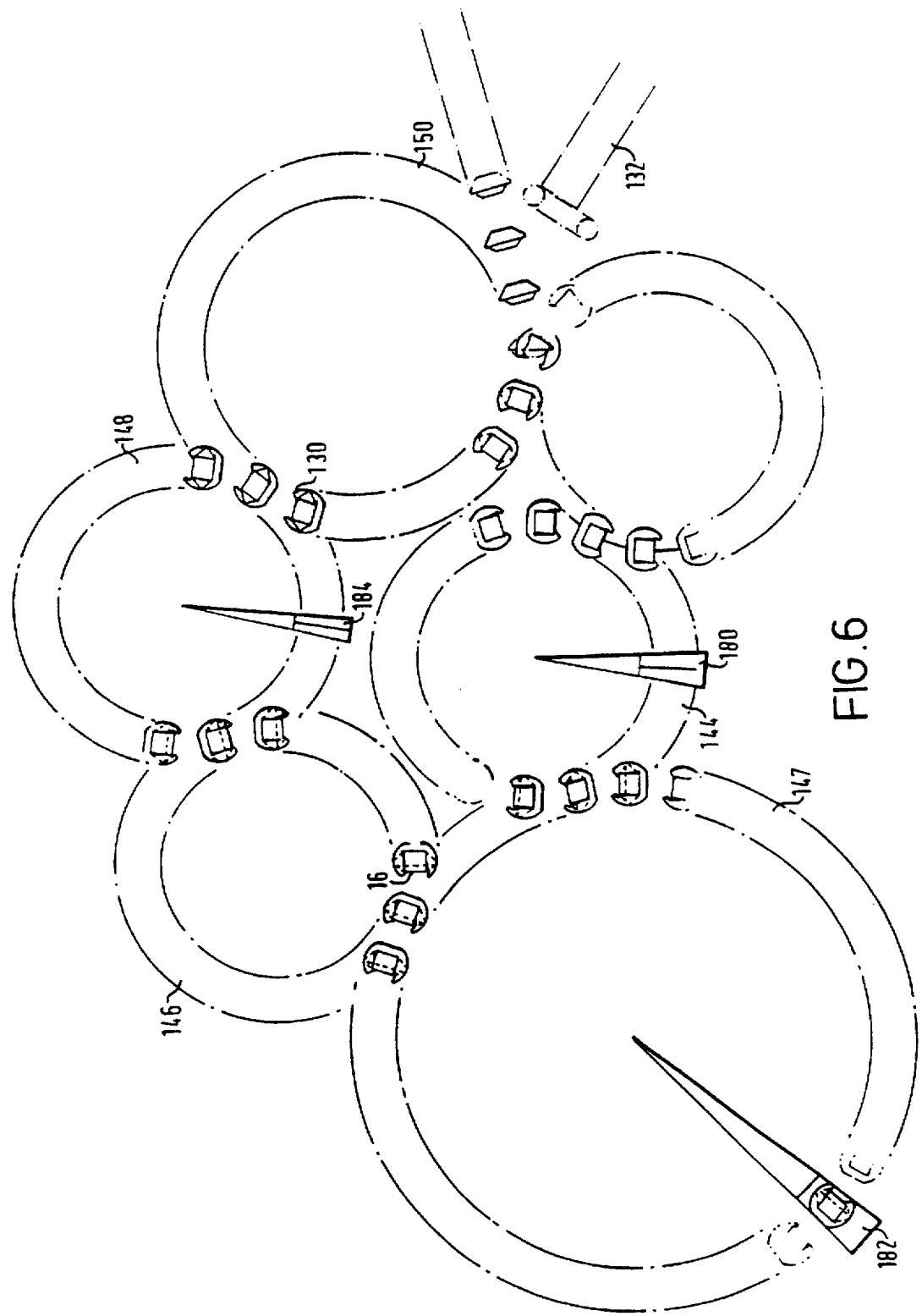
FIG. 6 is a schematic plan view of the second embodiment of the invention.

As shown in FIG. 6, in this embodiment flattened, tubular carton blanks are held in a magazine 132 and are erected into open tubular form and loaded on to a sixteen station first conveyor wheel 130 on which transport holders 110 are travelling. The blanks are transferred in a first transfer operation of the kind described above on to a sixteen station sealing conveyor wheel 144, equipped with sixteen bottom closure forming units 180 (one shown) which rotate with the wheel.

The blanks are transferred as described to a filling conveyor wheel 147 of thirty stations equipped with thirty rotating filling heads 192 (one shown).

From here the filled, bottom sealed cartons are transferred as described on to twenty-five station wheel 146, at which no operation is carried out on the cartons.

They are again transferred as described to a top seal wheel 148 of sixteen stations having sixteen co-rotating top seal units 184 (one shown).

The filled and sealed cartons are transferred as described to a last wheel 150 from which they are unloaded downwards from their transport holders on to a conveyor on which they are removed for further handling. The transport holders 110, now empty, are transferred as described back on to conveyor wheel 130 to be reloaded.

All of the conveyor wheels are driven via intermeshed respective gear wheels sharing a common drive so that synchrony of movement of the conveyor wheels is guaranteed. The number of stations on each wheel is selected so that each carton will have sufficient time on that particular wheel to undergo the particular process to which it is subjected, filling being the longest of the processes.

Whilst the invention has been described with reference to the illustrated embodiment, many modifications and variations thereof are possible within the scope of the invention.

For instance, instead of moving the magnet 156 away from the transport holder to trigger the transfer, one could move the magnet of the next upstream conveyor closer to the transport holder using a similar mechanism. Both magnets could still be of equal strength if during the normal carrying phase of the operation they were stood off a little from the transport holder and moved forward to increase the attraction at the required instant. Alternatively, the upstream conveyor magnet could be moved away and the downstream conveyor magnet could be moved forward simultaneously.

Where apparatus as described above is used for sterile packing, the appropriate parts of the apparatus will be sterilised before use and the apparatus will be flooded with sterile air during operation, as known in the art.

I claim:

1. A method of conveying objects comprising carrying said objects on a first conveyor and transferring said objects to a second conveyor in respective transfer operations, wherein said first conveyor and said second conveyor each have at least one location for carrying such objects, said locations being angularly fixed with respect to one another, each said location comprising a radially outward facing recess for receiving one side of a said object and having radially acting means comprising at least one magnet for holding a said object by its side in said location, and wherein each said object when held in a said location on said first conveyor follows a path which runs tangential to and in the same direction as a portion of a path followed by said second conveyor, such that during each said transfer operation the respective object is momentarily simultaneously disposed in the recess of a said location of said first conveyor and in the recess of a said location of said second conveyor to which the said object is being transferred.

2. A method as claimed in claim 1, wherein said recesses and said objects are so shaped that when a said object is simultaneously received in a pair of recesses of the first and second conveyors, the object is rotatable within each said recess about a respective axis transverse to the plane in which the object is being conveyed and each said recess has a surface engaging the object received therein which in cross-section transverse to said axis of rotatability defines a part circle.

3. A method as claimed in claim 1, wherein said objects are caused to transfer from the holding means of the first conveyor to the holding means of the second conveyor by the action of biasing means acting on said objects.

4. A method as claimed in claim 1, wherein at least one said magnet is an electromagnet and said object is caused no transfer from the first to the second conveyor by activation or deactivation of said electromagnet.

5. A method as claimed in claim 1, wherein said object is caused to transfer from the first to the second conveyor by a decrease in a magnetic force holding said object on the first conveyor when said object is momentarily simultaneously in a carrying location of said first conveyor and in a carrying location of said second conveyor.

6. A method as claimed in claim 5, wherein said decrease in magnetic force is produced by moving at least one magnet holding said object on said first conveyor away from said object.

7. A method as claimed in claim 5, wherein the magnetic attraction of said at least one magnet attracting said object to said first conveyor is substantially equal to the magnetic attraction of said at least one magnet for holding said object in said second conveyor, when said object is simultaneously in said carrying locations of said first and second conveyors, prior to said movement of said at least one magnet holding said object on said first conveyor.

8. A method as claimed in claim 1, wherein means are provided which vary the respective strengths of the magnetic attraction of said at least one magnet of the first conveyor and of the second conveyor while said object is simultaneously disposed in said locations so as to trigger transfer of said object form the first conveyor to the second conveyor.

9. A method of conveying objects in a closed path defined by a plurality of conveyors between which the objects are transferred in respective transfer operations, each conveyor having at least one location for carrying such objects, and each said location having means for holding a said object in said location, wherein in each transfer operation between a more upstream conveyor and a subsequent conveyor each said object is held in a said location on said more upstream conveyor and follows a path which runs tangential to and in the same direction as a portion of a path followed by a said location on said subsequent conveyor, and during each said transfer operation the respective object is momentarily simultaneously disposed in a said location of the said more upstream conveyor and in a said location of the subsequent conveyor to which the said object is being transferred.

10. A method as claimed in claim 9, wherein the objects are held in said locations by said holding means by magnetic attraction which is of approximately equal strength on all of said conveyors.

11. A method of packing materials in cartons including the steps of filling the cartons and top sealing the cartons, the improvement comprising: transporting cartons on a first conveyor in transport holders adapted to support the side walls of the cartons, subjecting the supported cartons to filling, transferring the cartons in their transport holders to a second conveyor in respective transfer operations, top sealing the cartons carried on the second conveyor to form closed filled cartons, and removing said cartons from said transport holders, wherein said first conveyor and said second conveyor each have at least one location for carrying transport holders, each said location having magnet means for holding a said transport holder in said location, and wherein each said transport holder when held in a said location on said first conveyor follows a path which runs tangential to and in a same direction as a portion of a path followed by said second conveyor and during each said transfer operation the respective transport holder is momentarily simultaneously disposed in a said location of said first conveyor and in a said location of said second conveyor to which the transport holder is being transferred, means being provided which varies the respective strength of a magnetic attraction of said magnet means of the first conveyor and the second conveyor whilst said transport holder is simultaneously in said locations so as to trigger transfer of said transport holder from the first conveyor to the second conveyor.

12. A method of packing materials in cartons including the steps of filling the cartons and top sealing the cartons, the improvement comprising: transporting cartons on a first conveyor in respective transport holders adapted to support the side walls of the cartons during said filling step, transferring the cartons in their respective transport holders to a second conveyor, carrying the cartons on the second conveyor during said top sealing step thereby to form closed filled cartons, and removing said cartons from said transport holders, wherein said first conveyor and said second conveyor each have at least one location, each for carrying a said transport holder, said locations being angularly fixed with respect to one another, each said location comprising a radially outward facing recess for receiving one side of a said transport holder and having radially acting means for holding a said transport holder by its side in said location, and wherein each said transport holder, when held in a said location on said first conveyor follows a path which runs tangential to and in a same direction as a portion of a path followed by said second conveyor, such that during each said transfer step the transport holder is momentarily simultaneously in the recess of a said location of said first conveyor and in the recess of a said location of said second conveyor to which the transport holder is being transferred.

13. Apparatus for conveying objects comprising a first conveyor for carrying said objects, a second conveyor for carrying said objects once transferred thereto in respective transfer operations from said first conveyor, said first conveyor and said second conveyor each having at least one location for carrying such objects and each said location having means for holding a said object in said location, said locations being angularly fixed with respect to one another, each said location comprising a radially outward facing recess for receiving one side of a said object and having radially acting means comprising at least one magnet for holding a said object by its side in said location, the conveyors being arranged such that each said object when held in a said location on a said first conveyor follows a path which runs tangential to and in the same direction as a portion of a path followed by said second conveyor, and means for causing each object in turn to transfer from the first conveyor to the second conveyor holding means in a said transfer operation, wherein during each said transfer operation the respective object is momentarily simultaneously disposed in a recess of a said location of said first conveyor and in the recess of a said location of said second conveyor to which the said object is being transferred.

14. Apparatus as claimed in claim 13, further comprising means for reducing the magnetic attraction holding said object on the first conveyor when said object is momentarily simultaneously disposed in a said location of said first conveyor and in a said location of said second conveyor.

15. Apparatus as claimed in claim 14, wherein said means for reducing the magnetic attraction holding said object on the first conveyor when said object is momentarily simultaneously disposed in a said location of said first conveyor and in a said location of said conveyor comprises means acting on at least one magnet holding an object on said first conveyor to move said magnet away from a respective location of said first conveyor.

16. Apparatus as claimed in claim 15, wherein said means for moving said magnet comprises a cam having a shaped cam surface, for each said location of said first conveyor, a cam follower mounted to move over said cam surface in synchrony with movement of said first conveyor, means connecting each said cam follower to a said magnet in the respective location to transmit movement to said cam follower to produce corresponding movement of said magnet, and means mounting the said magnet for movement away from a back towards an operative position in said location in response to movement of the respective cam follower.

17. Apparatus as claimed in claim 16, wherein said cam is a stationary cam having a closed curved cam path.

18. Apparatus for conveying objects in a closed path defined by a plurality of conveyors between which the objects are transferred in respective transfer operations, which apparatus comprises said conveyors, each conveyor having at least one location for carrying such objects, and each said location having means for holding a said object in said location, wherein in each transfer operation between a more upstream conveyor and a subsequent conveyor each said object is held in a said location on said more upstream conveyor and follows a path which runs tangential to and in the same direction as a portion of a path followed by a said location on said subsequent conveyor, and during each said transfer operation the respective object is momentarily simultaneously disposed in a carrying location of the said more upstream conveyor and in a carrying location of the subsequent conveyor to which the said object is being transferred.

19. Apparatus as claimed in claim 18, wherein the objects are held in said locations by said holding means by magnetic attraction which is of approximately equal strength on all of said conveyors.

20. Apparatus for conveying objects comprising a first conveyor and a second conveyor to which said objects are transferred in use from said first conveyor in respective transfer operations, wherein said first conveyor and said second conveyor each have at least one location for carrying such objects, each said location having magnet means for holding a said object in said location, and wherein each said object when held in a said location on said first conveyor follows a path which runs tangential to and in the same direction as a portion of a path followed by said second conveyor and during each transfer operation the respective object is momentarily simultaneously disposed in a said location of said first conveyor and in a said location of said second conveyor to which the object is being transferred, means being provided which varies the respective strengths of the magnetic attraction of said magnet means of the first conveyor and the second conveyor while said object is simultaneously in said locations so as to trigger transfer of said object form the first conveyor to the second conveyor.

21. Apparatus for packing materials in cartons comprising a series of conveyors, for carrying said cartons, means associated with each of a plurality of said conveyors for carrying out a respective treatment on said cartons whilst being carried on said conveyor, said treatments including at least filling and top sealing, the improvement comprising:

said conveyors each having at least one location for carrying a transport holder in which a said carton is disposed, said transport holders supporting the side walls of the carton disposed therein, each said location having means for holding a said transport holder in said location, the conveyors being arranged such that each said transport holder when held in a said location on an upstream conveyor follows a path which runs tangential to and in a same direction as a portion of a path followed by a subsequent conveyor in said series and a said transport holder will be momentarily simultaneously disposed in a said location of said upstream conveyor and in a said location of said subsequent conveyor such that said transport holder can be transferred from said upstream conveyor to said subsequent conveyor, and means for causing each transport holder in turn to transfer from each upstream conveyor to the next subsequent conveyor during said simultaneous disposition.

22. A method of packing materials in cartons including the steps of filling the cartons and top sealing the cartons, the improvement comprising:

conveying transport holders in a closed path defined by a plurality of conveyors between which the transport holders are transferred in respective transfer operations, each conveyor having at least one location for carrying such transport holders, and each said location having means for holding a said transport holder in said location, wherein in each transfer operation between a more upstream conveyor and a subsequent conveyor each said object is held in a said location on said more upstream conveyor and follows a path which runs tangential to and in the same direction as a portion of a path followed by a said location on said subsequent conveyor, and during each said transfer operation the respective transport holder is momentarily simultaneously disposed in a said location of the said more upstream conveyor and in a said location of the subsequent conveyor to which the said object is being transferred, transporting cartons on a first conveyor, each in a said transport holder, said transport holders being adapted to support the side walls of the cartons, subjecting the supported cartons to said filing step, transferring the cartons in their transport holders to a second conveyor in respective transfer operations, carrying said cartons on the second conveyor during said top sealing step to form closed filled cartons, and removing said cartons from said transport holders.

* * * * *